US009201134B2

United States Patent
Lee et al.

(10) Patent No.: US 9,201,134 B2
(45) Date of Patent: Dec. 1, 2015

(54) POSITIONING METHOD AND APPARATUS IN WIRELESS COMMUNICATION SYSTEM

(75) Inventors: Daewon Lee, Anyang-si (KR);
Kyungsoo Woo, Anyang-si (KR);
Suhwan Lim, Anyang-si (KR); Chijun Ahn, Anyang-si (KR)

(73) Assignee: LG Electronics Inc., Seoul (KR)

(*) Notice: Subject to any disclaimer, the term of this patent is extended or adjusted under 35 U.S.C. 154(b) by 106 days.

(21) Appl. No.: 13/885,945

(22) PCT Filed: Jun. 7, 2011

(86) PCT No.: PCT/KR2011/004142
§ 371 (c)(1),
(2), (4) Date: May 16, 2013

(87) PCT Pub. No.: WO2012/067328
PCT Pub. Date: May 24, 2012

(65) Prior Publication Data
US 2013/0237247 A1   Sep. 12, 2013
US 2015/0323644 A9   Nov. 12, 2015

Related U.S. Application Data

(60) Provisional application No. 61/414,874, filed on Nov. 17, 2010.

(30) Foreign Application Priority Data

Apr. 19, 2011   (KR) .................. 10-2011-0036362

(51) Int. Cl.
*H04W 24/10* (2009.01)
*G01S 5/06* (2006.01)
(Continued)

(52) U.S. Cl.
CPC ............. *G01S 5/06* (2013.01); *G01S 5/0236* (2013.01); *G01S 5/10* (2013.01)

(58) Field of Classification Search
IPC ..................................................... H04W 24/10
See application file for complete search history.

(56) References Cited

U.S. PATENT DOCUMENTS

2010/0103902 A1   4/2010   Kim et al.
2010/0317343 A1   12/2010  Krishnamurthy et al.
(Continued)

FOREIGN PATENT DOCUMENTS

JP   2007-6229 A    1/2007
JP   2011-49904 A   3/2011
(Continued)

OTHER PUBLICATIONS

3GPP TS 36.133, V8.13.0, (Apr. 2011), 3rd Generation Partnership Project, Technical Specification Group Radio Access Network, Evolved Universal Terrestrial Radio Access (E-UTRA), "Requirements for Support of Radio Resource Management," Apr. 12, 2011, 336 pages.
(Continued)

*Primary Examiner* — Diane Mizrahi
(74) *Attorney, Agent, or Firm* — Birch, Stewart, Kolasch & Birch, LLP

(57) ABSTRACT

A method and apparatus for determining a positioning measurement interval in a wireless communication system are disclosed. The method includes acquiring a message including Observed Time Difference of Arrival (OTDOA) related data in a higher layer, wherein the OTDOA related data includes a plurality of cell identifiers and Positioning Reference Signal (PRS) configuration information of corresponding cells, transmitting the ODTOA related data to a physical layer from the higher layer, and determining the RSTD measurement interval by the following Equation by using a plurality of cell-specific PRS periods obtained using the PRS configuration information in the physical layer: $T_{RSTD}=T_{PRS}\cdot(M-1)+\Delta$ where $T_{RSTD}$ denotes the length of the RSTD measurement interval, $T_{PRS}$ denotes the largest of the plurality of cell-specific PRS periods, M denotes the number of PRS positioning occasions, and $\Delta$ denotes a measurement time for one PRS positioning occasion.

12 Claims, 12 Drawing Sheets

(51) Int. Cl.
*G01S 5/02* (2010.01)
*G01S 5/10* (2006.01)

(56) References Cited

U.S. PATENT DOCUMENTS

| | | |
|---|---|---|
| 2010/0323683 A1 | 12/2010 | Kazmi et al. |
| 2010/0331009 A1 | 12/2010 | Krishnamurthy et al. |
| 2012/0027110 A1 | 2/2012 | Han et al. |
| 2012/0040691 A1 | 2/2012 | Han et al. |
| 2012/0083278 A1 | 4/2012 | Kazmi et al. |
| 2012/0108270 A1 | 5/2012 | Kazmi et al. |
| 2012/0190393 A1 | 7/2012 | Ishii et al. |
| 2012/0264449 A1* | 10/2012 | Kazmi et al. ............... 455/456.1 |
| 2013/0023285 A1* | 1/2013 | Markhovsky et al. ..... 455/456.1 |
| 2013/0260793 A1 | 10/2013 | Lim et al. |
| 2013/0343209 A1* | 12/2013 | Gordon .......................... 370/252 |
| 2014/0295882 A1* | 10/2014 | Guo et al. ................... 455/456.1 |

FOREIGN PATENT DOCUMENTS

| | | |
|---|---|---|
| JP | 2012-523738 A | 10/2012 |
| JP | 2012-525724 A | 10/2012 |
| JP | 2012-530394 A | 11/2012 |
| JP | 2012-531088 A | 12/2012 |
| JP | 2012-531583 A | 12/2012 |
| JP | 2013-536616 A | 9/2013 |
| JP | 2014-502067 A | 1/2014 |
| JP | 2014-504369 A | 2/2014 |
| KR | 10-2006-0003670 A | 1/2006 |
| KR | 10-0602189 B1 | 7/2006 |
| KR | 10-2008-0085653 A | 9/2008 |
| KR | 10-2008-0112115 A | 12/2008 |
| KR | 10-2010-0113036 A | 10/2010 |
| WO | WO 2005/106523 A1 | 11/2005 |
| WO | WO 2008/156293 A2 | 12/2008 |
| WO | WO 2009/022872 A2 | 2/2009 |
| WO | WO 2009/022873 A2 | 2/2009 |
| WO | WO 2009/022879 A2 | 2/2009 |
| WO | WO 2010/117220 A2 | 10/2010 |
| WO | WO 2010/126419 A1 | 11/2010 |
| WO | WO 2010/144765 A1 | 12/2010 |
| WO | WO 2012/008727 A2 | 1/2012 |
| WO | WO 2012/108812 A1 | 8/2012 |
| WO | WO 2012/108813 A1 | 8/2012 |
| WO | WO 2012/108814 A1 | 8/2012 |

OTHER PUBLICATIONS

3GPP TS 36.133, V9.5.0 (Oct. 2010), 3rd General Partnership Project, Technical Specification Group Radio Access Network, Evolved Universal Terrestrial Radio Access (E-UTRA), "Requirements for Support of Radio Resource Management," Release 9, Oct. 31, 2010, 389 pages.

3GPP TS 36.133, V9.7.0 (Apr. 2011), 3rd Generation Partnership Project, Technical Specification Group Radio Access Network, Evolved Universal Terrestrial Radio Access (E-UTRA), Requirements for Support of Radio Resource Management, Release 9), Apr. 12, 2011, 414 pages.

* cited by examiner (a)

(b)

POSITIONING METHOD AND APPARATUS IN WIRELESS COMMUNICATION SYSTEM

This application is the National Phase of PCT/KR2011/004142 filed on Jun. 7, 2011, which claims priority under 35 U.S.C. 119(e) to U.S. Provisional Application No. 61/414,874 filed on Nov. 17, 2010, and under U.S.C. 119(a) to Patent Application No. 10-2011-0036362 filed in the Republic of Korea on Apr. 19, 2011. Korean Application No. 10-2011-0036362 is hereby expressly incorporated by reference into the present application.

TECHNICAL FIELD

The present invention relates to wireless communication systems, and more particularly, to a method and apparatus for determining a positioning measurement interval in a wireless communication system.

BACKGROUND ART

First, a frame structure of a wireless communication system is described with reference to FIG. 1. FIG. 1 shows a frame structure of a Long Term Evolution (LTE) system. As shown, one subframe includes 10 subframes each having two slots. A time required to transmit one subframe is defined as a transmission time interval (TTI). For example, one subframe may have a length of 1 millisecond (ms), and one slot may have a length of 0.5 ms.

One slot includes a plurality of Orthogonal Frequency Division Multiplexing (OFDM) symbols. An OFDM symbol may also be referred to as a Single Carrier-Frequency Division Multiple Access (SC-FDMA) symbol or a symbol interval.

One slot includes 7 or 6 OFDM symbols depending on a length of a Cyclic Prefix (CP). In the LTE system, there are a normal CP and an extended CP. When a normal CP is used, one subframe includes 7 OFDM symbols, and when an extended CP is used, one subframe includes 6 OFDM symbols. The extended CP is used in case of a great delay spread.

FIG. 2 shows a slot structure of the LTE system. As shown in FIG. 2, a signal transmitted in each slot may be described by a resource grid consisting of $N^{DL}_{RB} N^{RB}_{sc}$ subcarriers and $N^{DL}_{symb}$ OFDM symbols. $N^{DL}_{RB}$ represents the number of Resource Blocks (RBs), $N^{DL}_{sc}$ represents the number of subcarriers in one RB, and $N^{DL}_{symb}$ represents the number of OFDM symbols in one slot.

Next, a positioning method to determine the position of a User Equipment (UE) according to the prior art will be described.

In recent times, there is a growing need for a positioning method to determine the position of a UE for a variety of applications. A Global Positioning System (GPS) based scheme and a terrestrial positioning based scheme are widely known as positioning methods of the UE.

The GPS based scheme measures the position of the UE using satellites. However, the GPS based scheme needs to receive signals from at least 4 satellites and cannot be used indoors.

Meanwhile, the terrestrial positioning based scheme measures the position of the UE location by using a timing difference between signals received from base stations (BSs) and needs to receive signals from at least 3 BSs. Although the terrestrial positioning based scheme has lower positioning capabilities than the GPS based scheme, it can be used in almost all environments. The terrestrial positioning based scheme estimates the position of the UE mainly using a synchronization signal or a reference signal. The terrestrial positioning based scheme is defined as different terms according to standard.

Namely, the terrestrial positioning based scheme is defined as Observed Time Difference Of Arrival (OTDOA) in a UMTS Terrestrial Radio Access Network (UTRAN), Enhanced Observed Time Difference (E-OTD) in a GSM/EDGE Radio Access Network (GERAN), and Advanced Forward Link Trilateration (AFLT) in CDMA 2000.

FIG. 3 shows an exemplary downlink OTDOA, which is one terrestrial positioning based scheme, used in 3GPP. As shown in FIG. 3, since a UE operates a reference clock based on a subframe transmitted by a current serving cell, signals received from neighbor cells have different Time Differences Of Arrival (TDOAs).

A positioning method of a UE using OTDOA is described by way of example. A reference cell may be a serving cell and, if the UE has performed a handover operation, the reference cell may be a serving cell before the handover operation. Alternatively, the reference cell may not be changed irrespective of the handover operation of the UE. The positioning method of the UE may be typically performed through a Common Reference Signal (CRS) or a Primary Synchronization Signal/Secondary Synchronization Signal (PSS/SSS), it may be performed by defining a dedicated Positioning Reference Signal (PRS) for a LoCation Service (LCS). The UE uses reference signals or synchronization signals received from one reference cell and a plurality of neighbor cells to calculate differences between a time required to receive a signal from the one reference cell and times required for receiving signals from the plurality of neighbor cells. The UE transmits the calculated time differences to an Enhanced-Serving Mobile Location Center (E-SMLC). The E-SMLC can then calculate the position of the UE by solving a linearized equation using the Taylor series expansion.

However, a plurality of cells can participate in determining the position of a UE. In actual implementation, a plurality of cells may have different PRS transmission periods.

If a PRS period varies according to each cell, since a plurality of measurement intervals for determining the position of the UE are present, the time when the UE should report measurement results is uncertain.

As described above, the prior art is problematic in that the time for a UE to report measurement results is uncertain since multiple measurement intervals for determining the position of the UE are present when PRS transmission periods of cells participating in the position determination of the UE differ.

DISCLOSURE

Technical Problem

An object of the present invention devised to solve the problem lies in providing a positioning method which can efficiently perform measurement and reporting at a UE by determining a measurement interval using a PRS period satisfying a predetermined condition among a plurality of PRS periods.

The technical problems to be solved in the present invention are not limited to the above-mentioned technical problem, and other technical problems not mentioned above can be clearly understood by one skilled in the art from the following description.

Technical Solution

The object of the present invention can be achieved by providing a method for determining a Reference Signal Time Difference (RSTD) measurement interval at a user equipment in a wireless communication system, including acquiring a message including Observed Time Difference Of Arrival (OTDOA) related data in a higher layer, wherein the OTDOA related data includes a plurality of cell identifiers and Positioning Reference Signal (PRS) configuration information of corresponding cells, transmitting the ODTOA related data to a physical layer from the higher layer, and determining the RSTD measurement interval by the following Equation by using a plurality of cell-specific PRS transmission periods obtained using the PRS configuration information in the physical layer:

$$T_{RSTD}=T_{PRS}\cdot(M-1)+\Delta \qquad \text{Equation}$$

where $T_{RSTD}$ denotes the length of the RSTD measurement interval, $T_{PRS}$ denotes the largest of the plurality of cell-specific PRS periods, M denotes the number of PRS positioning occasions, and $\Delta$ denotes a measurement time for one PRS positioning occasion.

The RSTD measurement interval may start from a subframe having the nearest PRS positioning occasion after the ODTOA related data is transmitted to the physical layer.

The method may further include providing RSTD measurement information to a location server after the RSTD measurement interval has elapsed.

The method may further include providing RSTD measurement information about one or more cells satisfying a predetermined condition within the RSTD measurement interval to the location server.

The method may further include providing RSTD measurement information about a reference cell to the location server after a measurement interval determined using a PRS period of the reference cell has elapsed within the RSTD measurement interval.

The message including the OTDOA related data may be received from a location server through a serving base station.

Advantageous Effects

According to the embodiments of the present invention, a UE can efficiently perform measurement and reporting by determining a measurement interval using a PRS period satisfying a predetermined condition among a plurality of PRS periods.

The effects of the present invention are not limited to the above-mentioned effect, and other effects not mentioned above can be clearly understood by one skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
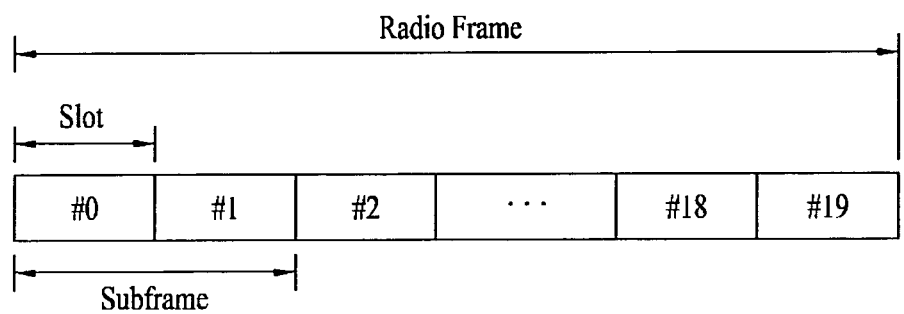
FIG. 1 shows a frame structure of a Long Term Evolution (LTE) system.
Figure 2:
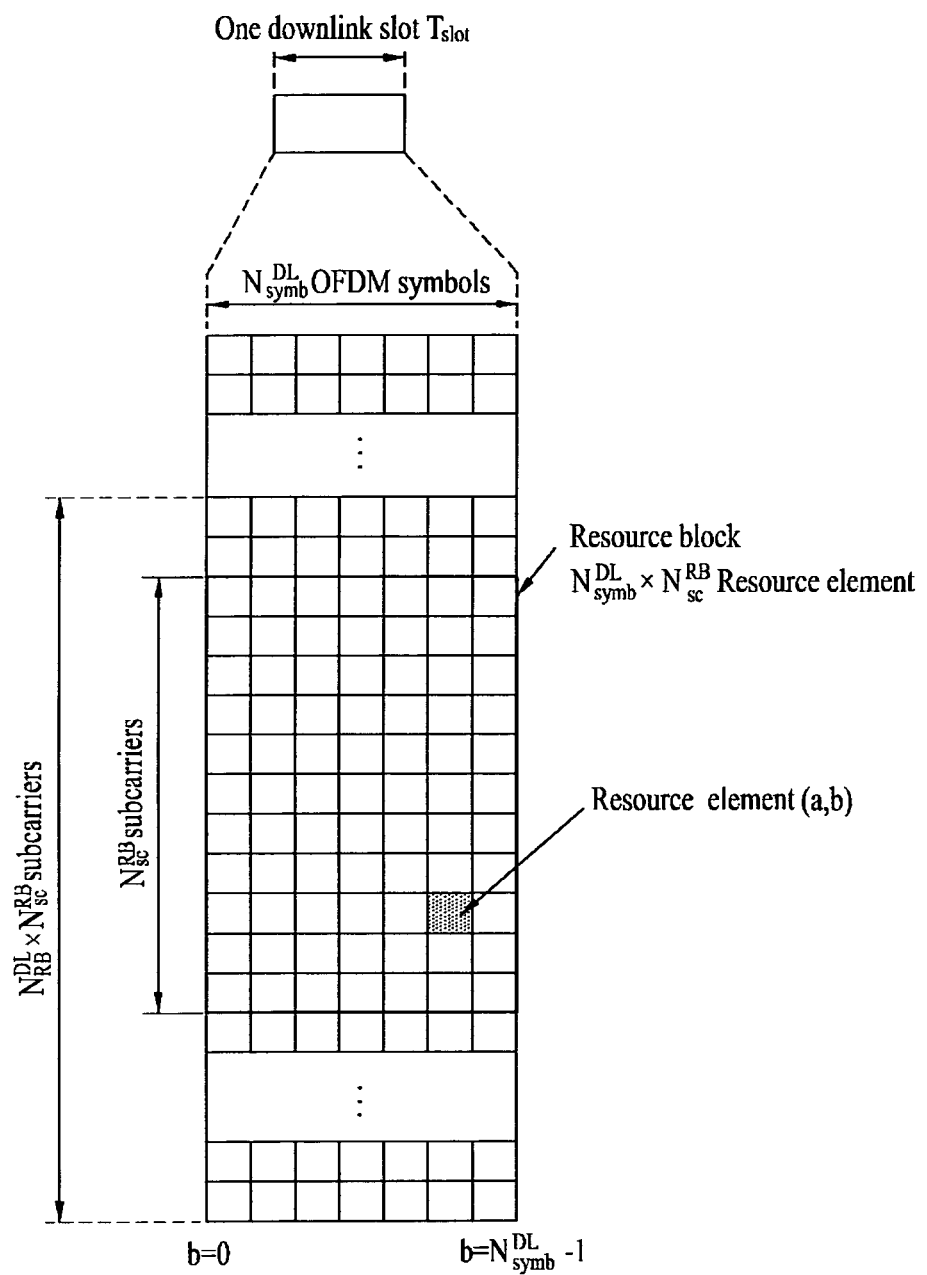
FIG. 2 shows a slot structure of the LTE system.

Hereinafter, exemplary embodiments of the present invention will be described with reference to the accompanying drawings. The detailed description, which will be disclosed along with the accompanying drawings, is intended to describe the exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details. For example, although a detailed example of a UMTS system as a mobile communication system is described in detail hereinbelow, aspects of the present invention that are not specific to the UMTS system are applicable to other mobile communication systems.

In some instances, known structures and/or devices are omitted or are shown in block diagram form focusing on important features of the structures and/or devices, so as not to obscure the concept of the present invention. The same reference numbers will be used throughout this specification to refer to the same or like parts.

In the following description, 'User Equipment (UE)' is assumed to refer to a mobile or fixed user end device such as a Mobile Station (MS) etc. and 'Base Station (BS)' is assumed to refer to any node of a network end, such as a Node B, eNode B, etc., communicating with the UE.

First, a 3GPP LTE system is described in brief as an exemplary mobile communication system to which a technique of the present invention is applied.

An E-UTRAN system has evolved from the existing UTRAN system, and basic standardization thereof is currently underway in 3GPP. The E-UTRAN system may also be referred to as an LTE system.

The E-UTRAN includes eNBs (e-NodeBs or BSs), and the eNBs are connected to one another through an X2 interface. The eNB is connected to a UE through a radio interface and is connected to an Evolved Packet Core (EPC) through an S1 interface.

The EPC includes a Mobility Management Entity (MME), a Serving-Gateway (S-GW), and a Packet Data Network-Gateway (PDN-GW). The MME contains access information or capability information of a UE, which is primarily used for mobility management of the UE. The S-GW is a gateway having the E-UTRAN as an end point, and the PDN-GW is a gateway having a PDN as an end point.

Layers of a radio interface protocol between a UE and a network may be divided into a first layer (L1), a second layer (L2) and a third layer (L3), based on the three lower layers of the Open Systems Interconnection (OSI) reference model that is well-known in the field of communication. A physical layer belonging to the first layer provides information transfer services using a physical channel. A Radio Resource Control (RRC) layer located at the third layer controls radio resources between the UE and the network, and to this end, the RRC layer exchanges RRC messages between the UE and the network.

Figure 4:
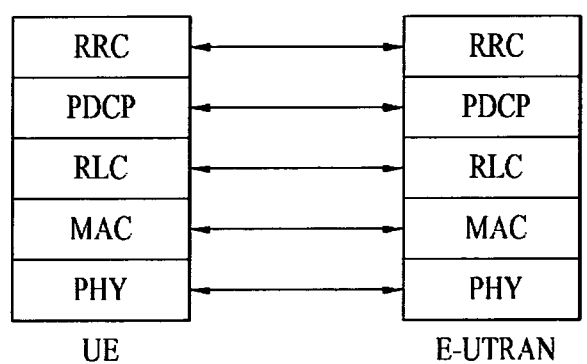
FIGS. 4 and 5 show structures of a radio interface protocol between a UE and an E-UTRAN, based on the 3GPP radio access network standard.
Figure 5:
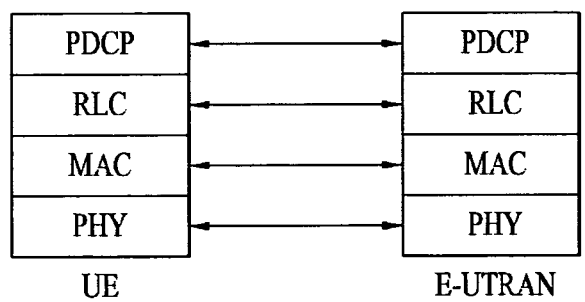

FIGS. 4 and 5 show structures of a radio interface protocol between a UE and an E-UTRAN, based on the 3GPP radio access network standard.

The radio interface protocol horizontally includes a physical layer, a data link layer and a network layer, and vertically includes a user plane (U-plane) for data information transfer and a control plane (C-plane) for control signaling. The protocol layers of FIGS. 4 and 5 may be divided into a first layer (L1), a second layer (L2) and a third layer (L3) based on the three lower layers of the OSI reference model that is well-known in the field of communication. Each radio protocol layer in the UE is paired with that in the E-UTRAN to transmit data for a radio section.

Hereinafter, each layer in a radio protocol C-plane of FIG. 4 and a radio protocol U-plane of FIG. 5 will be described.

A physical layer, which is a first layer, provides an information transfer service to an upper layer using a physical channel. The physical layer is connected to a Medium Access Control (MAC) layer of an upper layer via a transport channel. Data is transferred between the MAC layer and the physical layer via the transport channel. Data is also transferred between different physical layers, i.e., between a physical layer of a transmitting side and a physical layer of a receiving side via the physical channel. The physical channel is modulated using an Orthogonal Frequency Division Multiplexing (OFDM) scheme and uses time and frequency as radio resources.

A MAC layer of a second layer provides service to a Radio Link Control (RLC) layer of an upper layer via a logical channel. The RLC layer of the second layer supports reliable data transfer. Functions of the RLC layer may be implemented by a functional block within the MAC layer. In this case, the RLC layer may be omitted. A Packet Data Convergence Protocol (PDCP) layer of the second layer performs a header compression function. Namely, the PDCP layer reduces the header size of an Internet Protocol (IP) packet containing relatively large amount and unnecessary control information so as to efficiently transmit the IP packet such as an IPv4 packet or an IPv6 packet in a wireless section having a narrow bandwidth.

A Radio Resource Control (RRC) layer located at the uppermost portion belonging to a third layer is defined only in the control plane. The RRC layer serves to control logical channels, transport channels and physical channels in relation to configuration, re-configuration, and release of Radio Bearers. A radio bearer refers to a service provided by the second layer for data transfer between the UE and the network. The UE is in an RRC connected state (RRC_CONNECTED) if an RRC connection has been established between the RRC layer of the UE and the RRC layer of the radio network. Otherwise, the UE is in an RRC idle state (RRC_IDLE).

A downlink transport channel for data transfer from the network to the UE includes a Broadcast Channel (BCH) for transmitting system information and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, an uplink transport channel for data transfer from the UE to the network includes a Random Access Channel (RACH) for transmitting initial control messages and an uplink SCH for transmitting user traffic or control messages.

A logical channel, which is located at an upper level of the transport channels and is mapped to the transport channels, includes a Broadcast Control Channel (BCCH), a Paging Control Channel (PCCH), a Common Control Channel (CCCH), a Multicast Control Channel (MCCH), and a Multicast Traffic Channel (MTCH).

A physical channel includes a plurality of subframes in a time domain and a plurality of subcarriers in a frequency domain. Here, one subframe consists of a plurality of symbols in the time domain. One subframe consists of a plurality of resource blocks and one resource block includes a plurality of symbols and a plurality of subcarriers. Each subframe may use specific subcarriers of specific symbols (e.g., the first symbol) in the corresponding subframe for a Physical Downlink Control Channel (PDCCH), that is, for an L1/L2 control channel. One subframe may include two slots each having a time duration of 0.5 ms and may correspond to a TTI, as a unit time for data transfer, which is 1 ms.

Next, system information will be described. The system information includes essential information necessary for a UE to access a BS. Therefore, the UE should have received all of the system information prior to accessing the BS, and should also have the latest system information all the time. Since the system information should be known to all UEs in a cell, the BS periodically transmits the system information.

The system information is divided into a Master Information Block (MIB), a Scheduling Block (SB), a System Information Block (SIB), etc. The MIB allows the UE to be notified of a physical configuration of a corresponding cell, for example, a bandwidth. The SB allows the UE to be notified of the transmission information of SIBs, for example, a transmission interval. The SIB is a set of mutually-related system information. For example, a certain SIB includes only the information of neighbor cells, and another certain SIB includes only the information of an uplink radio channel used by the UE.

Meanwhile, services provided by the network to the UE may be divided into three types. The UE differently recognizes the type of a cell based on which service can be received. First, the type of services will be described, and then the type of a cell will be described.

1) Limited service: This service provides an emergency call and an Earthquake and Tsunami Warning Service (ETWS), and may be provided by an acceptable cell.

2) Normal service: This service refers to a public use with general purposes, and may be provided by a suitable cell.

3) Operator service: This service refers to a service for communication network service providers. This service can be used only by communication network service providers and may not be used by general users.

With regard to the service types provided by a cell, the type of a cell may be divided as follows.

1) Acceptable cell: A cell in which the UE may receive a limited service. This cell is not barred and satisfies the cell selection criteria of the UE from a standpoint of the corresponding UE.

2) Suitable cell: A cell in which the UE may receive a normal service. This cell satisfies the condition of an acceptable cell and simultaneously satisfies additional conditions. For additional conditions, the cell should belong to a Public Land Mobile Network (PLMN) which may be accessed by the corresponding UE and should not bar a Tracking Area Update procedure implemented by the UE. If the corresponding cell is a CSG cell, then it should be a cell that can be accessed by the UE as a CSG member.

3) Barred cell: A cell which broadcasts information representing that it is a barred cell through the system information.

4) Reserved cell: A cell which broadcasts information representing that it is a reserved cell through the system information.

Hereinafter, an RRC state and RRC connection method of a UE will be described in detail. The RRC state refers to whether the RRC of the UE is logically connected to the RRC of an E-UTRAN. If it is connected, this is called an RRC_CONNECTED state, and otherwise this is called an RRC_IDLE state. For the UE in an RRC_CONNECTED state, the E-UTRAN may recognize the presence of the corresponding UE in a cell unit because there exists an RRC connection, and thus the E-UTRAN may effectively control the UE. On the contrary, for the UE in an RRC_IDLE state, the E-UTRAN may not recognize the corresponding UE, and therefore, the UE is managed by a core network in a unit of a tracking area, which is an area unit larger than a cell. Namely, only the presence/absence of the UE in an RRC_IDLE state is recognized in a large area unit, and the UE should change to an RRC_CONNECTED state in order to receive typical mobile communication services such as voice or data services.

When the UE is initially turned on by a user, the UE first searches for a suitable cell and then maintains an RRC_IDLE state in the corresponding cell. The UE in the RRC_IDLE state establishes an RRC connection with the RRC of the E-UTRAN through an RRC connection procedure when there is a need to establish an RRC connection, thereby transitioning to an RRC_CONNECTED state. There are several cases where the UE needs to establish an RRC connection in an idle state. For example, uplink data transmission may be needed due to a phone call attempt by the user, or the transmission of a response message may be required in response to a paging message received from the E-UTRAN.

A Non-Access Stratum (NAS) layer located at an upper level of the RRC layer performs functions such as session management, mobility management, etc.

In order to manage the mobility of the UE at the NAS layer, both an EPS Mobility Management-REGISTERED (EMM-REGISTERED) state and an EMM-DEREGISTERED state are defined, and both states are applied to the UE and a Mobility Management Entity (MME). The UE is initially in an EMM-DEREGISTERED state, and performs a process of registering with the corresponding network through an Initial Attach procedure in order to access a network. If the Initial Attach procedure has been successfully performed, then the UE and the MME enter an EMM-REGISTERED state.

In order to manage a signaling connection between the UE and the EPC, both an EPS Connection Management (ECM)-IDLE state and an ECM-CONNECTED state are defined, and both states are applied to the UE and the MME. If the UE, in an ECM-IDLE state, makes an RRC connection with an E-UTRAN, then the UE enters an ECM-CONNECTED state. If the MME in an ECM-IDLE state makes an S1 connection with an E-UTRAN, then the MME enters an ECM-CONNECTED state. When the UE is in an ECM-IDLE state, the E-UTRAN has no context information on the UE. Accordingly, the UE in an ECM-IDLE state carries out a UE-based mobility procedure such as cell selection or reselection without receiving a command from the network. On the contrary, when the UE is in an ECM-CONNECTED state, the mobility of the UE is managed by a command from the network. If the location of the UE in an ECM-IDLE state is changed from the location that has been recognized by the network, the UE informs the network of the location thereof through a Tracking Area Update procedure.

Figure 6:
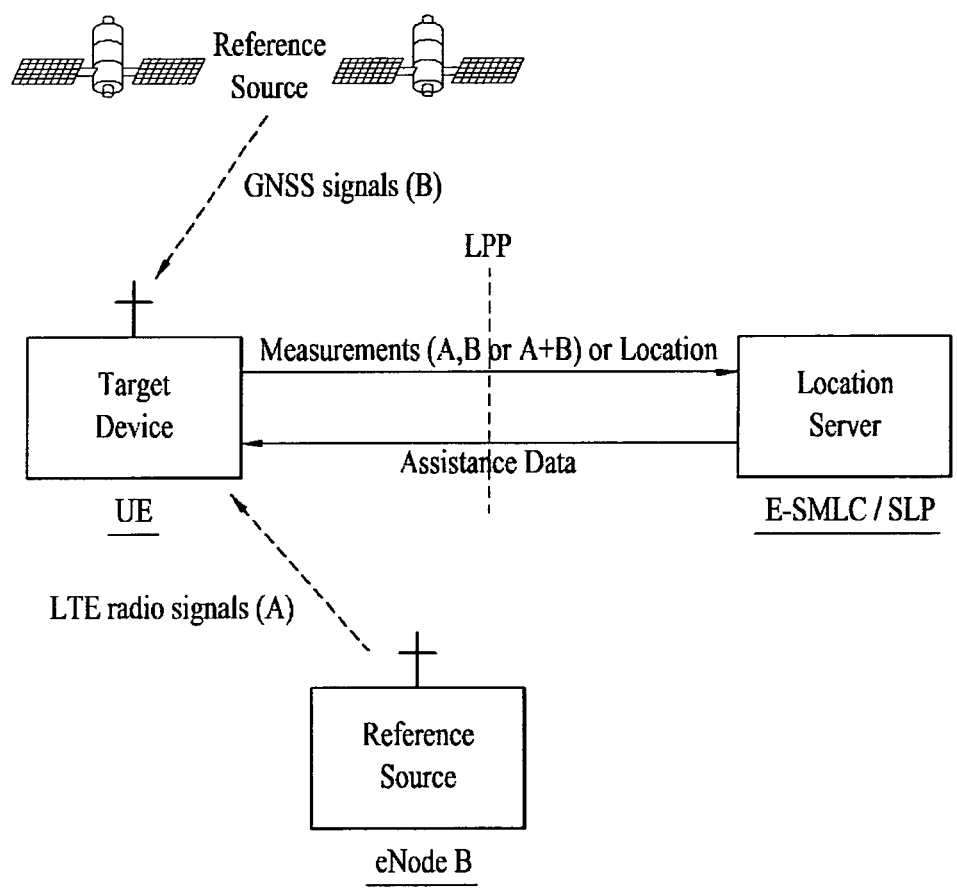
FIG. 6 shows a structure of an LPP in an E-UTRAN.

The E-UTRAN may transmit and receive data using an LTE Positioning Protocol (LPP). FIG. 6 shows a structure of an LPP in the E-UTRAN.

A target device, a UE, may acquire location related information from a reference source and may transmit and receive data to and from a location server through an LPP. The LPP may be used to support transmission/reception of a single piece of location data or may support transmission/reception of multiple pieces of location data.

Next, a Positioning Reference Signal (PRS) will be described.

A PRS is a reference signal used to determine the position of a UE and is transmitted only through resource blocks of a downlink subframe determined for PRS transfer.

A PRS sequence is defined by Equation 1.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1$$

[Equation 1]

Herein, $r_{l,n_s}(m)$ denotes a PRS sequence, $n_s$ denotes a slot number in a frame, l denotes an OFDM slot number in a slot, and c(i) denotes a pseudo random sequence. A pseudo random sequence generator is initialized to $c_{init}$ as expressed by Equation 2 at a start point of each OFDM symbol.

$$c_{init} = 2^{10} \cdot (7 \cdot (n_s+1)+l+1) \cdot (2 \cdot N_{ID}^{cell}+1) + 2 \cdot N_{ID}^{cell} + N_{CP}$$

[Equation 2]

Herein, $N_{ID}^{cell}$ denotes a physical layer cell ID, and $N_{CP}$ is 1 when OFDM symbols have a normal CP and 0 when OFDM symbols have an extended CP.

Figure 7:
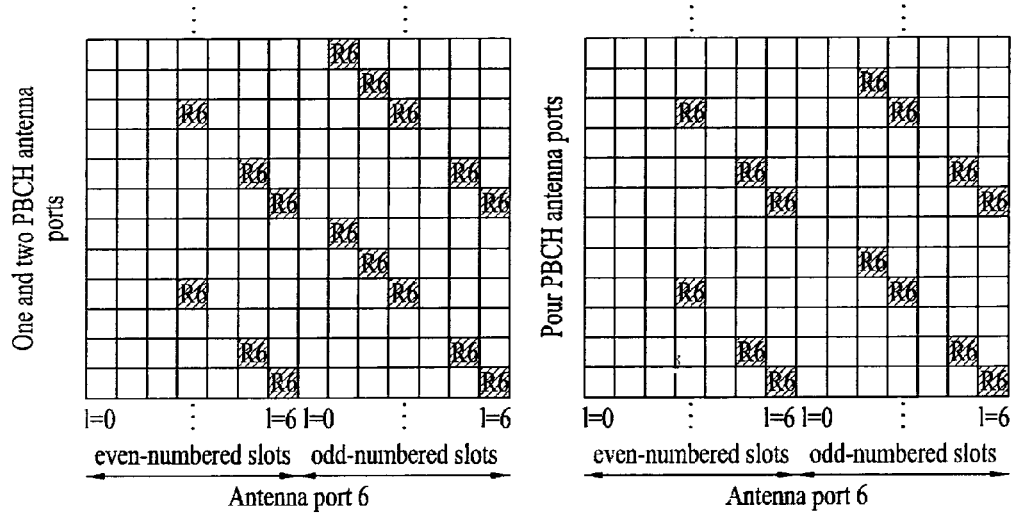
FIG. 7 is a diagram showing a pattern in which PRSs are allocated to resource elements.
Figure 7:
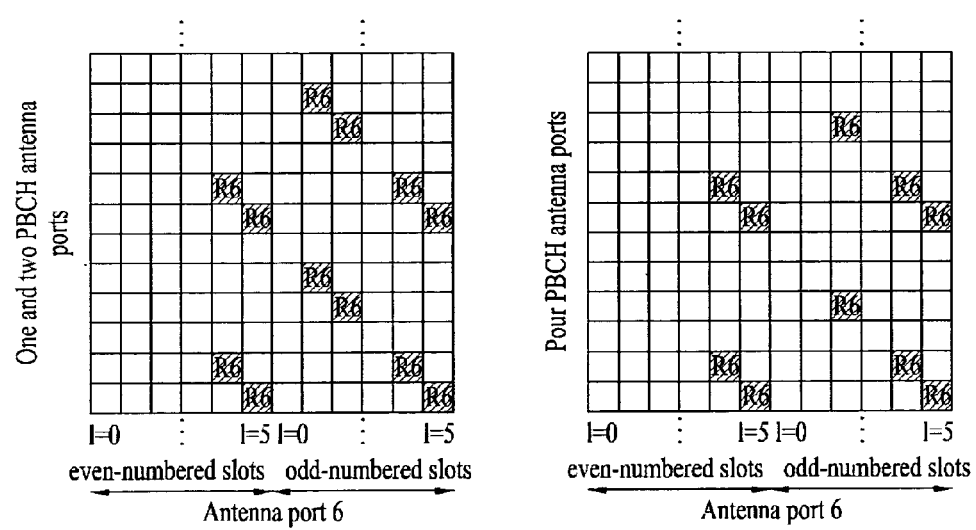

FIG. 7 is a diagram showing a pattern in which PRSs are allocated to resource elements. FIG. 7(a) shows a pattern in case of a normal CP and FIG. 7(b) shows a pattern in case of an extended CP.

Hereinafter, a positioning method of a UE according to an exemplary embodiment of the present invention will be described.

In the positioning method of the UE according to the exemplary embodiment of the present invention, the UE receives assistant data from a BS, receives PRSs from a reference cell and neighbor cells, calculates Reference Signal Time Differences (RSTDs) between the reference cell and the neighbor cells using the assistant data, and transmits the RSTDs to a serving BS. The serving BS transmits the RSTDs to a location server and the location server determines the location of the UE using the RSTDs.

RSTD refers to a relative timing difference between a reference cell and a neighbor cell and is defined by Equation 3.

$$T_{SubframeRxj} - T_{SubframeRxi}$$ [Equation 3]

Herein, $T_{SubframeRxj}$ denotes the time when a UE receives a start point of one subframe from a neighbor cell j and $T_{SubframeRxi}$ denotes the time when a UE receives, from a reference cell i, a start point of one subframe nearest the one subframe received from the cell j.

The reference cell and neighbor cells may transmit PRSs at a similar time. If the reference cell and neighbor cells transmit PRSs at a similar time, differences between the time when a UE receives a PRS from the reference cell and the times when the UE receives PRSs from the neighbor cells are within a given time range. For example, differences between the time when the UE receives a PRS from the reference cell and the times when the UE receives PRSs from the neighbor cells may be within one subframe. In the definition of an RSTD, if one subframe received from a neighbor cell j by a UE is a first subframe of PRS positioning occasions of the neighbor cell j, one subframe received from a reference cell i, which is nearest the one subframe received from the cell j, is a first subframe of PRS positioning occasions of the reference cell i. In this case, the PRS positioning occasions refer to consecutive downlink subframes to which PRSs are allocated. Accordingly, an RSTD is a difference between a time point at which a PRS is received from the neighbor cell j and a time point at which a PRS is received from the reference cell i. The time when a PRS is received from a specific cell is referred to as Time Of Arrival (TOA) of a PRS.

Figure 8:
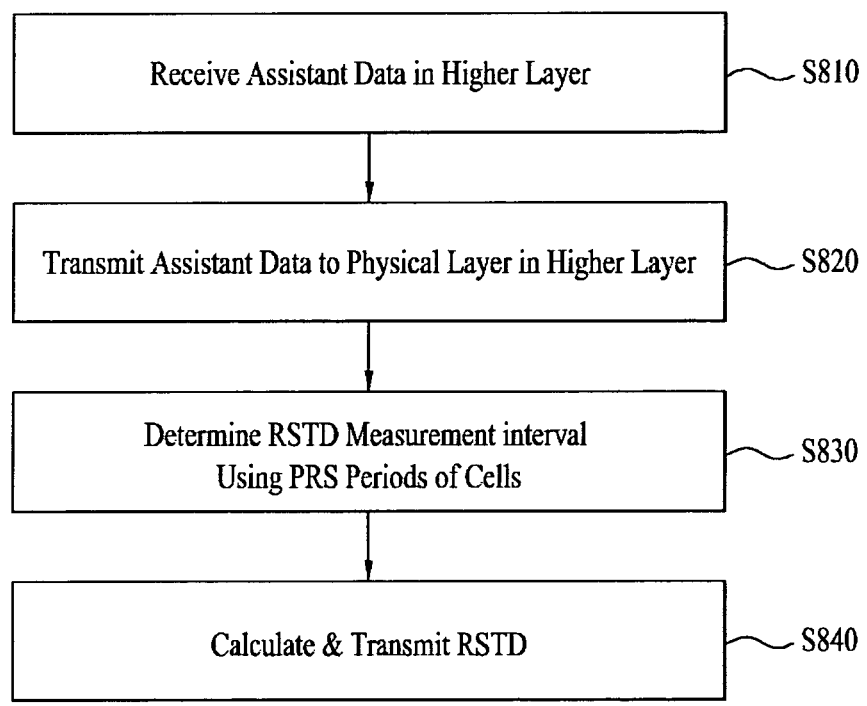
FIG. 8 is a flowchart showing a positioning method of a UE according to an exemplary embodiment of the present invention.

Specifically, a positioning method of a UE according to a first exemplary embodiment of the present invention will be described with reference to FIG. 8. FIG. 8 is a flowchart showing a positioning method of a UE according to an exemplary embodiment of the present invention.

As shown in FIG. 8, a higher layer of a UE receives assistant data from a location server (step S810). The assistant data may include information about a reference cell and/or at least one neighbor cell, necessary for the UE to calculate an RSTD.

Upon receiving the assistant data, the higher layer transmits the assistant data to a physical layer (step S820).

The physical layer determines an RSTD measurement interval using PRS periods of a plurality of cells indicated by the assistant data (step S830).

If the RSTD measurement interval is determined, an RSTD is calculated and the RSTD is transmitted to the location server (step S840).

Hereinafter, each step of the positioning method of the UE will be described in detail.

First, step S810 in which the UE receives assistant data through the higher layer will be described.

Figure 9:
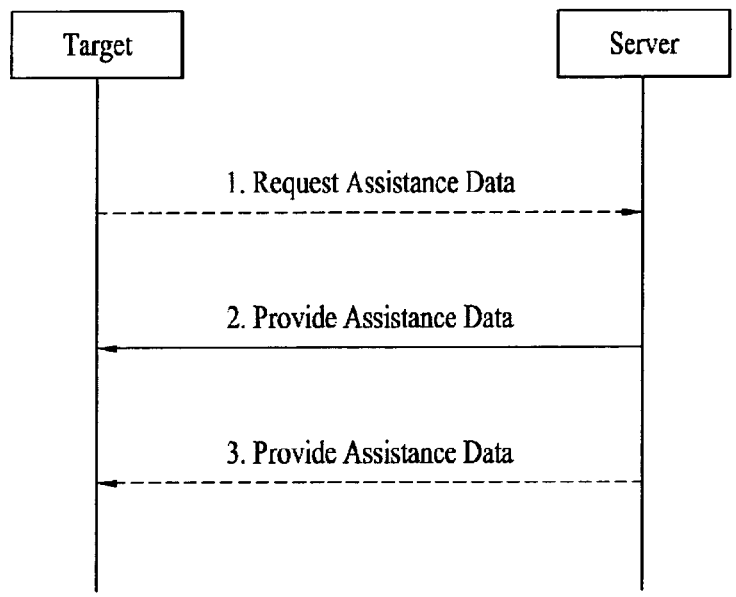
FIG. 9 is a diagram showing a process of requesting and receiving assistant data in a UE.

The UE may request, through a BS, that a location server transmit assistant data and receive the assistant data from the location server. FIG. 9 is a diagram showing a process of requesting and receiving assistant data in a UE. As shown in FIG. 9, the UE transmits an assistant data request (RequestAssistanceData) message to a location server through a BS. The location server transmits an assistant data provide (ProvideAssistanceData) message including the assistant data to the UE. The location server may transmit an additional assistant data provide message including additional assistant data to the UE. The assistant data provide message finally transmitted by the location server includes an end transaction indicator indicating that the message is a final message.

Alternatively, the location server may transmit an assistant data provide message to the UE without a request of the UE.

Figure 10:
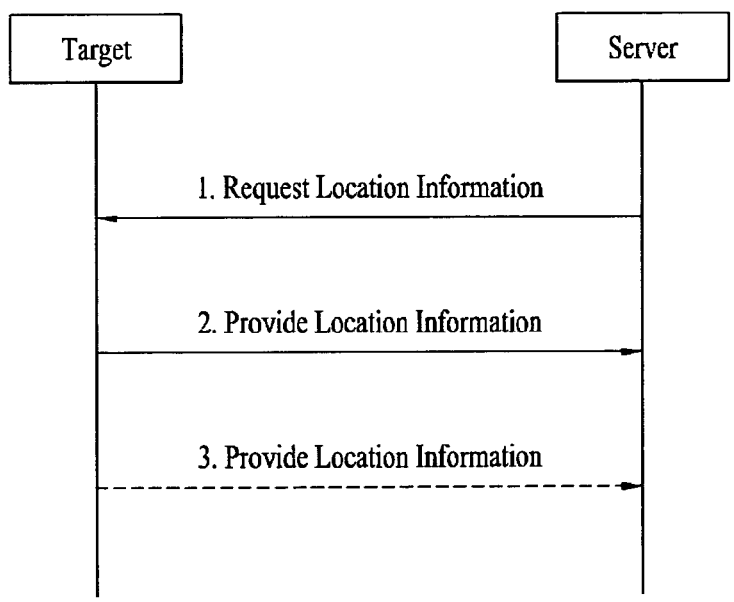
FIG. 10 is a diagram showing a process of transmitting location information.

Meanwhile, a target device (UE) and the location server may exchange location information. FIG. 10 is a diagram showing a process of transmitting location information.

The location server transmits a location information request (RequestLocationInformation) message to the UE in order to request location information. In this case, a necessary type of location information or additional assistant Quality of Service (QoS) may be indicated.

The UE transmits a location information provide (ProvideLocationInformation) message to the location server in order to transmit location information. The transmitted location information should match or be a subset of location information requested in a previous step unless the location server explicitly permits the UE to transmit additional location information.

Upon receiving an additional location information request message, the UE transmits an additional location information provide (ProvideLocationInformation) message to the location server in order to transmit location information. The transmitted location information should match with or be a subset of location information requested in a previous step unless the location server explicitly permits the UE to transmit additional location information. A finally transmitted provide message includes an end transaction indicator indicating that the message is a final message.

Next, the assistant data received by a UE is described in detail.

Table 1 shows OTDOA assistant data included in the ProvideAssistanceData message.

TABLE 1

```
- - ASNISTART
OTDOA-ProvideAssistanceData : : = SEQUENCE {
     otaoa-ReferenceCellInfo    otaoa-ReferenceCellInfo    OPTIONAL,
     otaoa-NeighbourCellInfo    otaoa-NeighbourCellInfo    OPTIONAL,
     otaoa-Error                otaoa-Error                OPTIONAL,
     ...
}
- - ASNISTOP
```

As shown in Table 1, the OTDOA assistant data includes OTDOA reference cell information (otdoa-ReferenceCellInfo) and OTDOA neighbor cell information (otdoa-NeighbourCellInfo).

First, the otdoa-ReferenceCellInfo included in the OTDOA assistant data will be described.

Table 2 shows the otdoa-ReferenceCellInfo.

TABLE 2

```
- - ASNISTART
OTDOA-ProvideAssistanceData : : = SEQUENCE {
    physcellId          INTEGER (0..503),
    cellGlobalId        ECGI                    OPTIONAL,       -- Need ON
    earfcnRef           ARFCN-ValueEUTRA        OPTIONAL,       --
Cond NotSameAsServ0
    antennaPortConfig   ENUMERATED {ports1-or-2, ports4, ... }
                                                OPTIONAL,       -- Cond
NotSameAsServ1
    cpLength            ENUMERATED { normal, extended, ... },
    prsInfo             PRS-Info                OPTIONAL,       -- Cond
PRS
    . . .
)
- - ASNISTOP
```

The otdoa-ReferenceCellInfo includes information about a reference cell. As shown in Table 2, otdoa-ReferenceCellInfo includes a physical cell ID (physCellId), antenna port configuration (antennaPortConfig), a cyclic prefix length (cpLength), and PRS information (prsInfo).

The physCellId indicates a physical cell ID of a reference cell, and the antennaPortConfig indicates whether a reference cell uses at least one antenna port or 4 antenna ports for a cell-specific reference signal. The cpLength indicates the length of a CP used when a reference cell transmits a PRS. Among information in the otdoa-ReferenceCellInfo, the prs-Info will be described in detail with reference to Table 3. Table 3 shows the prsInfo.

The prs-MutingInfo indicates PRS muting configuration of a corresponding cell. The PRS muting configuration is defined as a periodic PRS muting sequence having a period of $T_{PRS}$ which is indicated by the number of PRS positioning occasions. The PRS positioning occasions include $N_{prs}$ downlink subframe. The prs-MutingInfo may be defined based on a System Frame Number (SFN) of a serving cell or a reference cell. If the prs-MutingInfo is defined as an SFN of a serving cell, the first bit of a PRS muting sequence corresponds to the first positioning occasion starting after a start point of a frame in which an SFN of the serving cell is 0. If the prs-MutingInfo is defined as an SFN of a reference cell, the first bit of a PRS muting sequence corresponds to the first

TABLE 3

```
- - ASNISTART
PRS-Info : : = SEQUENCE {
    prs-Bandwidth           ENUMERATED { n6, n15, n25, n50, n75, n100, ...},
    prs-ConfigurationIndex  INTEGER (0..4095),
    numDL-Frames            ENUMERATED { sf-1, sf-2, sf-4, sf-6, ...},
    . . . ,
    prs-MutingInfo-r9       CHOICE {
        po2-r9                  BIT STRING (SIZE (2)),
        po4-r9                  BIT STRING (SIZE (4)),
        po8-r9                  BIT STRING (SIZE (8)),
        po16-r9                 BIT STRING (SIZE (16)),
        . . . ,
    }                                               OPTIONAL    --Need OP
}
- - ASNISTOP
```

As shown in Table 3, the prsInfo includes a PRS bandwidth (prs-Bandwidth), a PRS configuration index (prs-ConfigurationIndex), a downlink frame number (numDL-Frames), and PRS muting information (prs-MutingInfo).

The prs-Bandwidth indicates a bandwidth used to determine a PRS and the numDL-Frames indicates the number, $N_{prs}$, of consecutive downlink subframes to which PRSs are allocated.

positioning occasion starting after a start point of a frame in which an SFN of the reference cell is 0.

The prs-ConfigurationIndex indicates a PRS configuration index. The PRS configuration index $I_{PRS}$ represents information about the time when a PRS is transmitted.

Next, the otdoa-NeighbourCellInfo included in the OTDOA assistant data will be described.

Table 4 shows the otdoa-NeighbourCellInfo.

TABLE 4

```
- - ASNISTART
OTDOA-NeighbourCellInfoList : : = SEQUENCE (SIZE (1..maxFreqLayers)) OF OTDOA-NeighbourFreqInfo
OTDOA-NeighbourCellInfo : : = SEQUENCE (SIZE (1..24)) OF OTDOA-NeighbourCellInfoElement
OTDOA-NeighbourCellInfoElement : : = SEQUENCE {
    physcellId      INTEGER (0..503),
    cellGlobalId    ECGI                OPTIONAL,       -- Need ON
    earfcn          ARFCN-ValueEUTRA    OPTIONAL,       -- Cond NotSameAsRef0
    cpLength        ENUMERATED { normal, extended, ... }
                                        OPTIONAL,       -- Cond NotsameAsref1
    prsInfo         prs Info            OPTIONAL,       -- Cond NotsameAsref1
```

TABLE 4-continued

| | | | |
|---|---|---|---|
| antennaPortConfig | ENUMERATED {ports-1-or-2, ports-4, ... } | | |
| | | OPTIONAL, | -- Cond NotsameAsref3 |
| slotNumberOffset | INTEGER (0..31) | OPTIONAL, | -- Cond NotsameAsref4 |
| prs-subframeOffset | INTEGER (0..1279) | OPTIONAL, | -- Cond InterFreq |
| expectedRSTD | INTEGER (0..16383), | | |
| expectedRSTD-Uncerainty | INTEGER (0..1023), | | |
| ... | | | |

}
maxFreqLayers INTEGER : : = 3
- - ASNISTOP

As shown in Table 4, the otdoa-NeighbourCellInfo includes at least one OTDOA neighbor cell information element (OTDOA-NeighbourCellInfoElement). A plurality of OTDOA-NeighbourCellInfoElement included in the otdoa-NeighbourCellInfo may be arranged in a descending order according to priority of neighbouring cells for RSTD measurement of a UE. Namely, the first OTDOA-NeighbourCellInfoElement included in the otdoa-NeighbourCellInfo may be OTDOA-NeighbourCellInfoElement of a neighbouring cell having the highest priority for RSTD measurement of a UE.

Each OTDOA-NeighbourCellInfoElement includes a physical cell identity (physCellId), a cyclic prefix length (cpLength), PRS information (prsInfo), antenna port configuration (antennaPortConfig), a slot number offset (slotNumberOffset), a PRS subframe offset (prs-SubframeOffset), an expected RSTD value (expectedRSTD), and uncertainty of the expected RSTD value (expectedRSTD-Uncertainty).

The physCellId indicates a physical cell ID of a neighbor cell, the antennaPortConfig indicates whether a neighbor cell uses one (or two) antenna ports or 4 antenna ports, for a cell-specific reference signal, and the cpLength indicates the length of a CP of a PRS of a neighbor cell.

Figure 3:
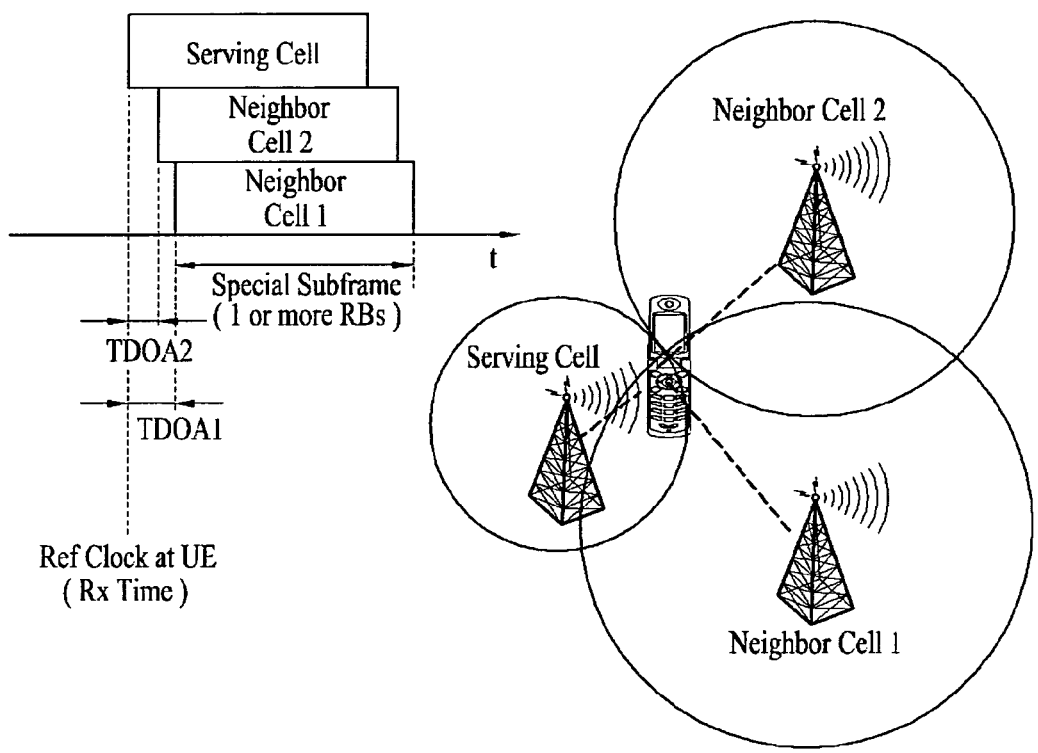
FIG. 3 shows an exemplary downlink OTDOA, which is one terrestrial positioning based scheme, used in 3GPP.

The prsInfo indicates information about PRS configuration of a neighbor cell. The prsInfo included in the OTDOA-NeighbourCellInfoElement has the same format as the prsInfo included in otdoa-ReferenceCellInfo shown in FIG. 3. Namely, the prsInfo includes prs-Bandwidth, prs-ConfigurationIndex, numDL-Frames, and prs-MutingInfo.

The prs-Bandwidth indicates a bandwidth used to transmit a PRS of a neighbor cell, the numDL-Frames indicates the number, $N_{prs}$, of consecutive downlink subframes to which PRSs of neighbor cells are allocated, the prs-MutingInfo indicates PRS muting configuration of a neighbor cell, and the prs-ConfigurationIndex indicates a PRS configuration index of a neighbor cell.

The slotNumberOffset indicates a slot number offset of a reference cell and a neighbor cell. The slotNumberOffset represents an offset from a start point of a specific radio frame of a reference cell to a start point of a radio frame of a neighbor cell which first appears after the specific radio frame. The slotNumberOffset is expressed by the number of slots. If a slot timing of a neighbor cell is the same as that of a reference cell, a slotNumberOffset field may be omitted.

The prs-SubframeOffset indicates an offset of a first PRS subframe of a reference cell in a reference subcarrier frequency and a first PRS subframe of a PRS burst of a neighbor cell, which first appears after the first PRS subframe of the reference cell, in another subcarrier frequency. The prs-SubframeOffset is expressed by the number of subframes.

The expectedRSTD indicates an RSTD value which is expected to be measured by a UE. If $T_s$ is 1/(15000*2048) seconds, resolution of the expectedRSTD is $3T_s$.

The expectedRSTD-Uncertainty indicates uncertainty of the expectedRSTD value. Namely, expectedRSTD-Uncertainty indicates an error range of the expectedRSTD value. Uncertainty of the expectedRSTD value is associated with UE position estimation of a location server. The expectedRSTD-Uncertainty defines a search window of a UE as shown in Equation 4 and resolution of the expectedRSTD-Uncertainty is $3T_s$.

[expectedRSTD−expectedRSTD_Uncertainty]<measured RSTD<[expectedRSTD+expectedRSTD_Uncertainty]  [Equation 4]

Returning to the position method of a UE shown in FIG. 8, upon receiving the assistant data, the higher layer of the UE transmits the assistant data to a physical layer (step S820). The physical layer determines an RSTD measurement interval using PRS periods of a plurality of cells indicated by the assistant data (step S830).

In relation to the above processes, a method for determining a PRS period according to a PRS configuration index included in the prsInfo will be described.

Table 5 shows a PRS period $T_{PRS}$ and a PRS subframe offset $\Delta_{PRS}$ according to a PRS configuration index $I_{PRS}$.

TABLE 5

| PRS configuration Index ($I_{PRS}$) | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | | Reserved |

The PRS configuration index is received by a physical layer from a higher layer. A PRS is transmitted only in configured subframes and transmitted only in $N_{PRS}$ consecutive downlink subframes. $N_{PRS}$ is configured in a higher layer. The first subframe among $N_{PRS}$ consecutive subframes in which a PRS is transmitted satisfies Equation 5.

$(10 \times n_f + \lfloor n_s/2 \rfloor - \Delta_{PRS}) \bmod T_{PRS} = 0$.  [Equation 5]

Herein, $n_f$ denotes an SFN and $n_s$ denotes a slot number. That is, upon receiving the ProvideAssistanceData message, a UE can discern PRS information using the prs-ConfigurationIndex of at least one cell included in the ProvideAssistanceData message.

Next, a method for determining an RSTD measurement interval $T_{RSTD}$ by using a PRS period in order for a UE to receive and measure signals from a BS will be described.

If both physical layer cell IDs of neighbor cells and OTDOA assistant data are provided, a UE can receive and measure an RSTD. n is at least 16 cells including a reference cell in a frequency band and the reference cell satisfies $T_{RSTD}$ ms given by the following equation.

$$T_{RSTD}=T_{PRS}\cdot(M-1)+\Delta_{ms} \quad \text{[Equation 6]}$$

Herein, $T_{RSTD}$ denotes a total time necessary for search and measurement in at least n cells, $T_{PRS}$ denotes a cell-specific positioning subframe configuration period, M denotes the number of PRS positioning occasions, and $$\Delta = 160\cdot\left\lceil\frac{n}{M}\right\rceil$$

ms denotes a measurement time for one PRS positioning occasion and includes a sampling time and a processing time.

Table 6 shows the number, M, of positioning occasions.

TABLE 6

| Positioning subframe configuration period $T_{PRS}$ | Number of PRS positioning occasions M | |
|---|---|---|
| | f1 (intra-frequency) | f1 and f2 (inter-frequency) |
| 160 ms | 16 | 32 |
| >160 ms | 8 | 16 |

If the RSTD measurement interval $T_{RSTD}$ is determined, an RSTD measured within $T_{RSTD}$ can be transmitted (step S840). In this case, it is desirable to transmit the measured RSTD information after the RSTD measurement interval $T_{RSTD}$ in order to assure signal accuracy. However, it is possible to transmit RSTD related information even before the RSTD measurement interval $T_{RSTD}$ in the case where a preset signal strength condition etc. is satisfied.

Figure 11:
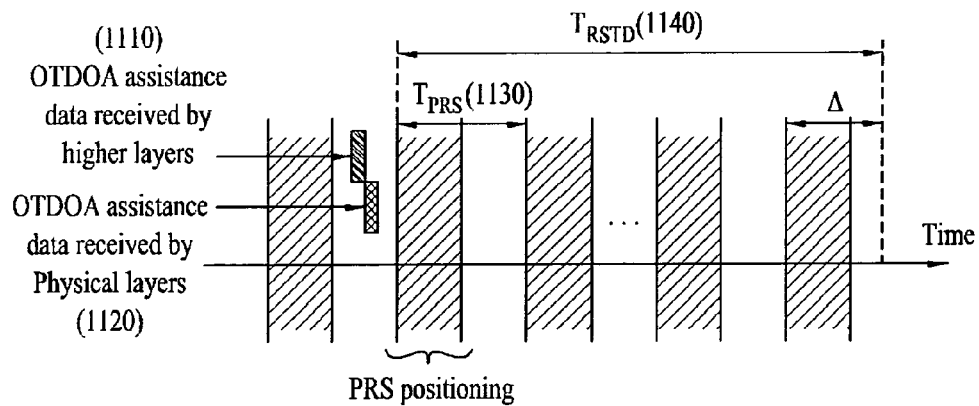
FIG. 11 is a diagram showing a process of transmitting assistant data to a physical layer and determining an RSTD measurement interval using a PRS period.

FIG. 11 is a diagram showing a process of transmitting assistant data to a physical layer and determining an RSTD measurement interval using a PRS period.

Referring to FIG. 11, if assistant data is received by higher layers (step 1110), the higher layers transmit the assistant data to physical layers (step 1120). A PRS period $T_{PRS}$ is determined according to the assistant data (step 1130) and an RSTD measurement interval $T_{RSTD}$ is determined according to the determined $T_{PRS}$ (step 1140).

Accordingly, a PRS received from each cell is measured based on the RSTD measurement interval $T_{RSTD}$ and a TOA is calculated so that an RSTD may be reported to a location server.

If a UE calculates the $T_{RSTD}$ using the above-described method, a plurality of cells (e.g. femto, pico and macro cells) may have different PRS transmission periods. Then, it is uncertain when the UE should perform report and measurement. This will be described with reference to FIG. 12.

Figure 12:
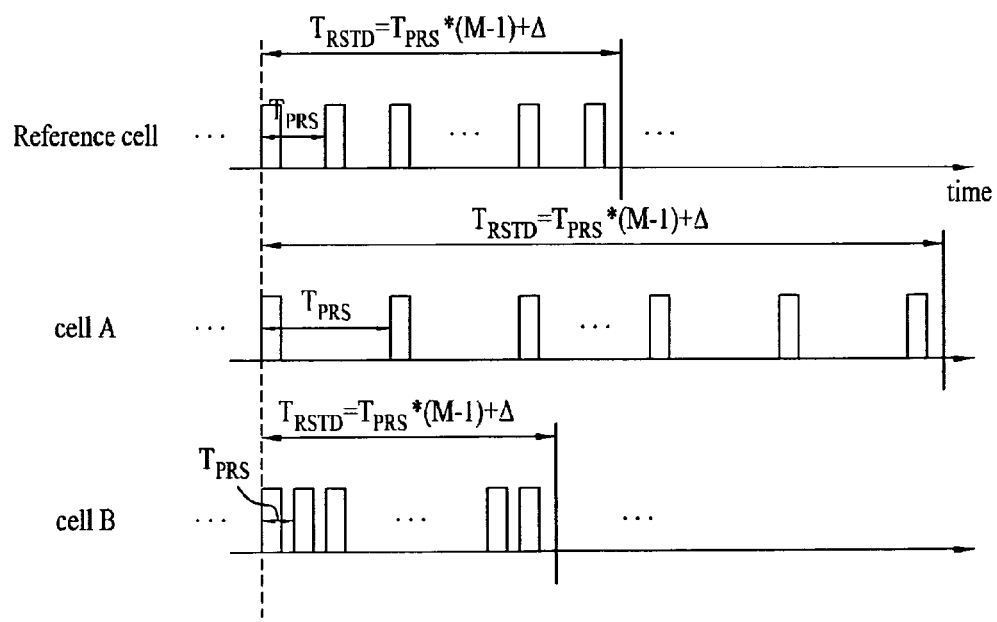
FIG. 12 is a diagram showing a process of determining positioning measurement intervals when a PRS period varies according to each cell.

FIG. 12 is a diagram showing a process of determining positioning measurement intervals when a PRS period varies according to each cell.

It is assumed in FIG. 12 that a UE receives a PRS from a reference cell, a cell A, and a cell B.

Among the reference cell and the cells A and B, since the cell B has the shortest PRS period ($T_{PRS}$), an RSTD measurement interval ($T_{RSTD}$) of the cell B is calculated as the shortest value.

Next, a $T_{RSTD}$ of the reference cell having the second longest $T_{RSTD}$ is calculated and a $T_{RSTD}$ of the cell A is calculated as the longest value.

If the $T_{RSTD}$ of each of the plurality of cells (the reference cell, cell A, and cell B) has elapsed, the UE reports the measured RSTD. Namely, the UE should repeatedly report the RSTD so that performance deterioration may occur.

According to the present invention, a positioning method is provided in which a $T_{RSTD}$ is determined using a PRS period ($T_{PRS}$) of a predetermined condition among PRS periods ($T_{PRS}$) of a plurality of cells and a UE can efficiently perform measurement and reporting using the determined $T_{RSTD}$.

An exemplary method of the present invention will be described in detail with reference to FIG. 13.

Figure 13:
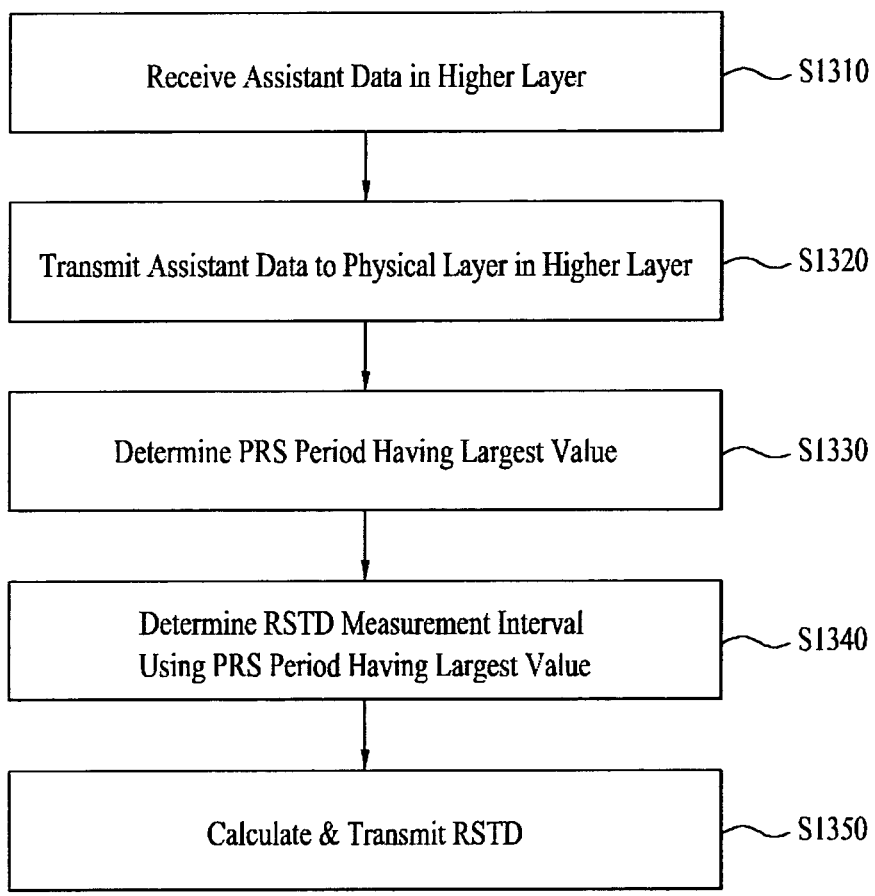
FIG. 13 is a flowchart showing a process of applying a measurement interval using the longest PRS period according to an exemplary embodiment of the present invention.

FIG. 13 is a flowchart showing a process of applying a measurement interval using the longest PRS period according to an exemplary embodiment of the present invention.

Steps S1310, S1320, and S1350 shown in FIG. 13 are similar to steps S810, S820, and S840, respectively and therefore a description thereof is omitted.

As described previously, OTDOA related data (e.g. assistant data), which is received by a higher layer and is transmitted to a physical layer, includes a plurality of cell IDs and PRS configuration information of corresponding cells.

The physical layer may calculate a specific PRS period of a plurality of cells by using the PRS configuration information included in the data.

Conventionally, a $T_{RSTD}$ is calculated using each $T_{PRS}$ as described with reference to FIG. 12. However, according to the present invention, a $T_{RSTD}$ is calculated using a $T_{PRS}$ having the largest value among cell-specific PRS transmission periods (steps S1330 and S1340).

To calculate the $T_{RSTD}$, equation $T_{RSTD}=T_{PRS}\cdot(M-1)+\Delta$ is used as described above. Herein, $T_{RSTD}$ denotes the length of an RSTD measurement interval, $T_{PRS}$ denotes the largest value of the plurality of cell-specific PRS transmission periods, M denotes the number of PRS positioning occasions, and $\Delta$ denotes a measurement time for one PRS positioning occasion.

In this case, the $T_{RSTD}$ is calculated using the longest $T_{RSTD}$ of the cell-specific PRS periods. If the calculated $T_{RSTD}$ has elapsed, a UE reports measured RSTDs for a plurality of cells. Since the calculated $T_{RSTD}$ is always greater than $T_{RSTD}$ calculated using PRS transmission periods of other cells, measurement accuracy can be maintained and a plurality of positioning related information can be provided to a location server through a single reporting.

Figure 14:
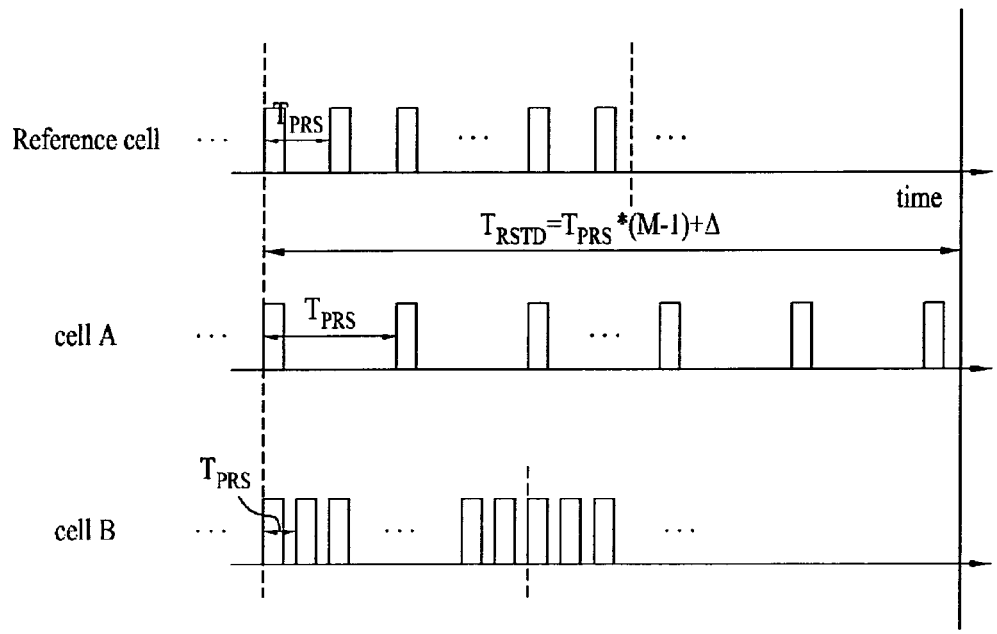
FIG. 14 is a diagram showing a process of applying an RSTD measurement interval using the longest PRS period according to an exemplary embodiment of the present invention.

To describe the present invention in more detail, reference is made to FIG. 14.

FIG. 14 is a diagram showing a process of applying an RSTD measurement interval using the longest PRS period according to an exemplary embodiment of the present invention.

It is assumed that a UE receives PRSs from a reference cell, a cell A, and a cell B and measurement intervals $T_{RSTD}$ of the respective cells are increased in order of the cell B, the reference cell, and the cell A.

Referring to FIG. 14, RSTDs are calculated for PRS values received from a plurality of cells based on a $T_{RSTD}$ of the cell A having the largest value among $T_{RSTD}$ calculated based on PRS periods of the respective cells, and the calculated RSTDs are transmitted to a location server. Since the $T_{RSTD}$ of the cell A is longer than a $T_{RSTD}$ of the reference cell or a $T_{RSTD}$ of the cell B, the $T_{RSTD}$ of the other cells is guaranteed and measurement accuracy is ensured. Further, since a $T_{RSTD}$ of one cell (e.g., cell A) is used without reporting RSTDs calculated according to $T_{RSTD}$ of the respective cells, a repeated reporting execution operation of a UE is simplified.

In this case, an RSTD measurement interval may be started from a subframe having the nearest PRS positioning occasion after assistant data is transmitted to a physical layer.

Generally, location information reporting of a UE is performed after a $T_{RSTD}$ calculated to ensure signal accuracy has elapsed. However, if a preset signal strength condition is satisfied, the reporting may be performed even before $T_{RSTD}$ has elapsed.

Meanwhile, according to another exemplary embodiment of the present invention, a UE may provide RSTD measurement information for one or more cells satisfying a preset condition within a $T_{RSTD}$ determined based on the longest $T_{PRS}$ to a location server.

For example, if a $T_{RSTD}$ of a reference cell has elapsed even within a $T_{RSTD}$ determined based on the longest $T_{PRS}$, an RSTD value measured for at least one cell having a $T_{RSTD}$ within the $T_{RSTD}$ of the reference cell may be reported to the location server.

The above-described method is for exemplary purposes only and the present invention is not limited thereto.

Figure 15:
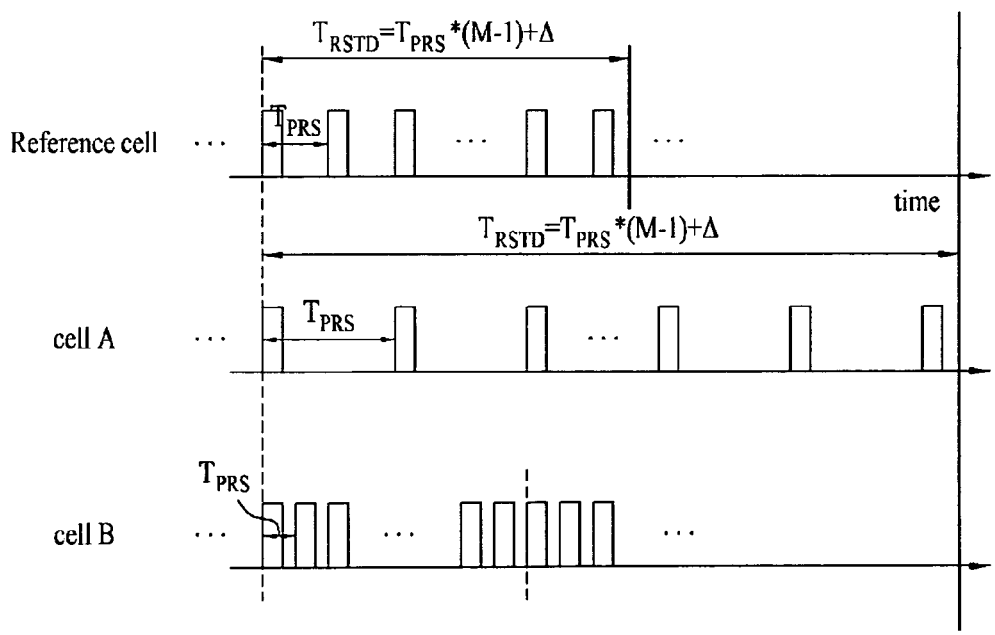
FIG. 15 is a diagram showing a process of applying an RSTD measurement interval using a PRS period of a reference cell and the longest PRS period according to an exemplary embodiment of the present invention.

FIG. 15 is a diagram showing a process of applying an RSTD measurement interval using a PRS period of a reference cell and the longest PRS period according to an exemplary embodiment of the present invention.

It is assumed that a $T_{RSTD}$ is applied by a preset reference.

As shown in FIG. 15, a UE basically provides RSTD measurement information for a plurality of cells based on a $T_{RSTD}$ determined using the longest $T_{PRS}$ to a location server.

In this case, even before the $T_{RSTD}$ determined using the longest $T_{PRS}$ has elapsed, a $T_{RSTD}$ determined using a $T_{PRS}$ of the reference cell may have elapsed.

Then the UE transmits a determined RSTD of at least one cell having a $T_{RSTD}$ within the $T_{RSTD}$ of the reference cell to the location server. Therefore, it may be possible to transmit, to the location server, RSTD values of a plurality of cells using the $T_{RSTD}$ determined using the longest $T_{PRS}$ and the $T_{RSTD}$ determined using the $T_{PRS}$ of the reference cell.

Generally, location information of a UE is reported after a $T_{RSTD}$ calculated to ensure signal accuracy has elapsed. However, if a preset signal strength condition is satisfied, the reporting may be performed even before the $T_{RSTD}$ has elapsed.

Although not shown, as another method associated with the exemplary embodiment of the present invention, a condition that the RSTD measurement information is reported in a $T_{RSTD}$ of each cell after a $T_{RSTD}$ of the reference cell has elapsed may be set.

Namely, the UE simultaneously reports RSTD values of a plurality of cells based on a $T_{RSTD}$ determined using the longest $T_{PRS}$. Here, if a $T_{RSTD}$ determined using a PRS transmission period of the reference cell has elapsed, the UE may provide RSTD measurement information about the reference cell to the location server and thereafter if a $T_{RSTD}$ of each cell longer than the $T_{RSTD}$ of the reference cell has elapsed, the UE may provide RSTD measurement information about the cell to the location server.

Generally, location information report of a UE is performed after a $T_{RSTD}$ calculated to ensure signal accuracy has elapsed. However, if a preset signal strength condition is satisfied, the reporting may be performed even before the $T_{RSTD}$ has elapsed.

According to a further exemplary embodiment of the present invention, the UE may provide RSTD measurement information for a plurality of cells using a $T_{RSTD}$ determined based on a $T_{PRS}$ of a reference cell to the location server.

Since the reference cell, a fixed cell, provides important information to determine the location of a UE, the UE may report a plurality of RSTD values according to a $T_{RSTD}$ determined based on a $T_{PRS}$ of the reference cell instead of the longest $T_{RRS}$.

Figure 16:
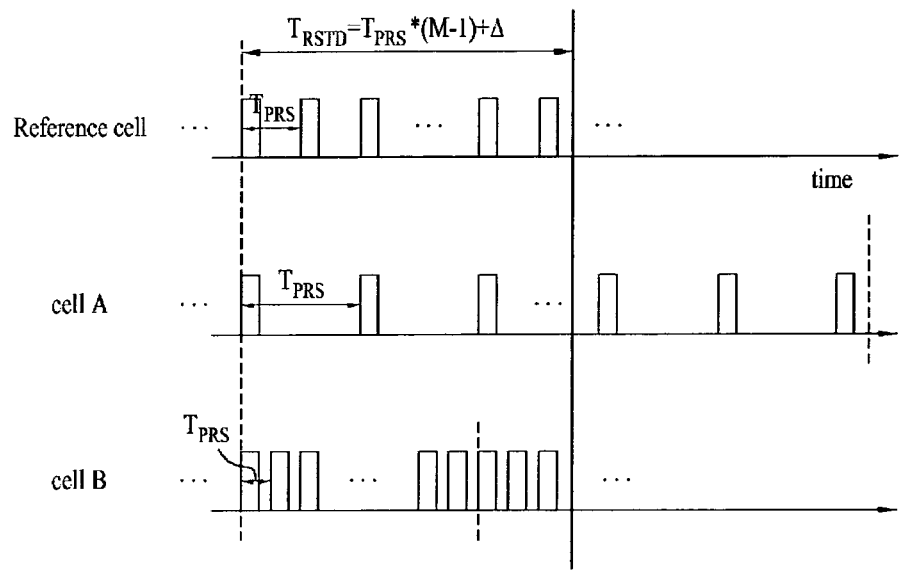
FIG. 16 is a diagram showing a process of determining a measurement interval using a PRS period of a reference cell according to another exemplary embodiment of the present invention.

FIG. 16 is a diagram showing a process of applying a measurement interval using a PRS period of a reference cell according to another exemplary embodiment of the present invention.

Referring to FIG. 16, among $T_{RSTD}$ calculated based on $T_{PRS}$ of a plurality of cells, a $T_{RSTD}$ of the reference cell is used. Namely, a UE may transmit calculated RSTD values of the respective cells to a location server after the $T_{RSTD}$ of the reference cell has elapsed.

The reference cell may provide a reference value compared with values of other cells. If the UE performs reporting based on one $T_{RSTD}$, a reporting time can be clearly determined and deterioration in an error or function of the UE can be prevented.

Generally, location information of a UE is reported after a $T_{RSTD}$ calculated to ensure signal accuracy has elapsed. However, if a preset signal strength condition is satisfied, the reporting may be performed even before the $T_{RSTD}$ has elapsed.

Figure 17:
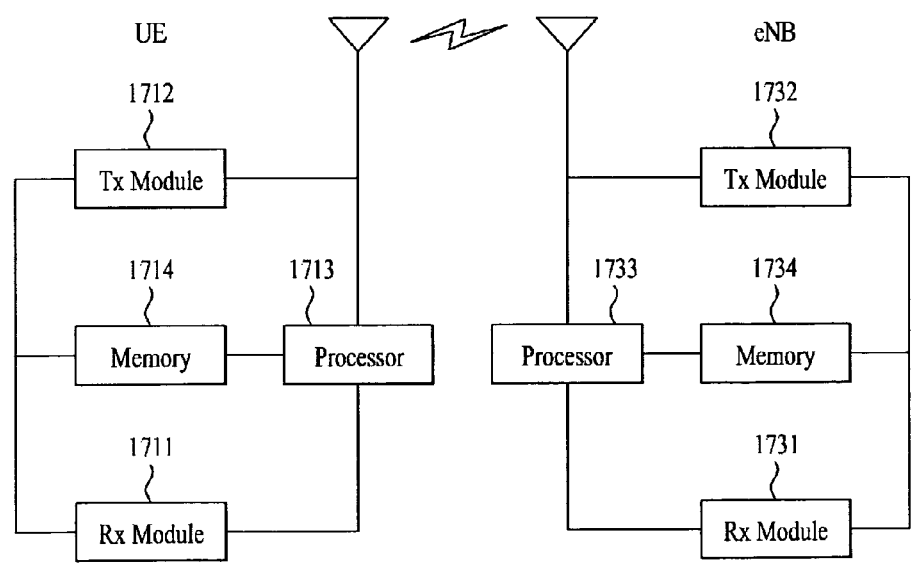
FIG. 17 is a diagram illustrating a transmitter and a receiver through which exemplary embodiments of the present invention can be implemented.

FIG. 17 is a diagram illustrating a transmitter and a receiver through which exemplary embodiments of the present invention can be implemented.

Each of the transmitter and receiver may be a UE or a BS and the UE and BS may communicate with each other through a location server.

The transmitter and receiver include antennas for transmitting and receiving information, data, signals, and/or messages, transmission (Tx) modules 1712 and 1732 for transmitting messages by controlling the antennas, reception (Rx) modules 1711 and 1731 for receiving messages by controlling the antenna, memories 1714 and 1734 for storing communication related information, and processors 1713 and 1733 for controlling the TX modules, Rx modules and memories, respectively.

The antennas transmit signals generated from the Tx modules 1712 and 1732 to the outside, or transfer radio signals received from the outside to the Rx modules 1711 and 1731. If a Multiple Input Multiple Output (MIMO) function is supported, the transmitter and receiver may include two or more antennas.

The processors 1713 and 1733 generally control overall operations of the transmitter or receiver. Especially, the processors 1713 and 1733 may carry out a control function for performing the embodiments of the present invention, a MAC frame variable control function based on service characteristics and a propagation environment, a handover function, and an authentication and encryption function. Each of the processors 1713 and 1733 may include an encryption module for encrypting various messages and a timer module for controlling the transmission and reception of various messages.

The processor 1713 of the UE receives PRSs from a reference cell and a plurality of neighbor cells using system information received from the BS and measures RSTDs between the reference cell and the plurality of neighbor cells.

In this case, the processor 1713 may calculate a $T_{RSTD}$ using a $T_{PRS}$ having the greatest value among cell-specific transmission periods.

The $T_{RSTD}$ is calculated by equation $T_{RSTD} = T_{PRS} \cdot (M-1) + \Delta$. Herein, $T_{RSTD}$ denotes the length of an RSTD measurement interval, $T_{PRS}$ denotes the largest value of the plurality of cell-specific PRS periods, M denotes the number of positioning occasions, and $\Delta$ denotes a measurement time for one PRS positioning occasion.

The processor 1733 of the BS determines the location of the UE using RSTDs received from the UE.

The TX modules 1712 and 1732 perform predetermined coding and modulation upon signals and/or data, which are scheduled by the processors and transmitted to the outside, and then transfer the modulated signals and/or data to the antennas.

The Tx module 1712 of the UE transmits RSTDs between the reference cell and the plurality of neighbor cells to the location server.

The Tx module 1732 of the BS transmits system information including information about the reference cell and the plurality of cells to the UE.

The Rx modules 1711 and 1731 decode and demodulate upon radio received from the outside through the antennas and transfer the demodulated signals to the processors 1713 and 1733.

The Rx module 1711 of the UE receives system information including information about a reference cell and a plurality of neighboring cells from a location server. The system information includes cells in which a UE can obtain an SFN as the reference cell or the plurality of neighboring cells.

The Rx module 1731 of the BS receives RSTDs between the reference cell and the plurality of neighboring cells from the UE.

The memories 1714 and 1734 may store programs required for signal processing and control of the processors and temporarily store input and output data (in the case of the UE, uplink grant allocated from the BS, system information, a STation IDentifier (STID), a Follow IDentifier (FID), action time, area allocation information, frame offset information etc.).

The memories 1714 and 1734 may include at least one type of storage medium among a flash memory-type storage medium, a hard disk-type storage medium, a multimedia card micro-type storage medium, a card-type memory (e.g. a Secure Digital (SD) or extreme Digital (XS) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disk.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may implement the present invention by combination of respective configurations described in the above embodiments.

Accordingly, the invention should not be limited to the specific embodiments described herein, but should be accorded the broadest scope consistent with the principles and novel features disclosed herein.

INDUSTRIAL APPLICABILITY

The embodiments of the present invention can be applied to various wireless access systems. Examples of the various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A method for determining a Reference Signal Time Difference (RSTD) measurement interval at a user equipment in a wireless communication system, comprising:

acquiring, by the user equipment, a message including Observed Time Difference Of Arrival (OTDOA) assistant data in a higher layer, wherein the OTDOA assistant data includes cell identifiers of a plurality of cells and Positioning Reference Signal (PRS) configuration information of the plurality of cells;

delivering, by the user equipment, the OTDOA assistant data to a physical layer from the higher layer; and determining, by the user equipment, the RSTD measurement interval by the following Equation by using a plurality of cell-specific PRS transmission periods obtained using the PRS configuration information:

$$T_{RSTD} = T_{PRS} \cdot (M-1) + \Delta \qquad \text{Equation}$$

where $T_{RSTD}$ denotes the length of the RSTD measurement interval, $T_{PRS}$ denotes the largest value of the plurality of cell-specific PRS transmission periods, M denotes the number of PRS positioning occasions in the RSTD measurement interval, and $\Delta$ denotes a measurement time for one PRS positioning occasion.

2. The method of claim 1, wherein the RSTD measurement interval starts from a subframe having the nearest PRS positioning occasion after the OTDOA assistant data is transmitted to the physical layer.

3. The method of claim 1, further comprising providing, by the user equipment, RSTD measurement information to a location server after the RSTD measurement interval has elapsed.

4. The method of claim 3, further comprising providing, by the user equipment, RSTD measurement information about one or more cells satisfying a predetermined condition within the RSTD measurement interval to the location server.

5. The method of claim 3, further comprising providing, by the user equipment, RSTD measurement information about a reference cell to the location server after a measurement interval determined using a PRS period of the reference cell has elapsed within the RSTD measurement interval.

6. The method of claim 1, wherein the message including the OTDOA assistant data is received from a location server through a serving base station.

7. A user equipment configured to determine a Reference Signal Time Difference (RSTD) measurement interval in a wireless communication system, comprising:

a Radio Frequency (RF) unit; and a processor;

wherein the processor acquires a message including Observed Time Difference of Arrival (OTDOA) assistant data in a higher layer, the OTDOA assistant data includes cell identifiers of a plurality of cells and Positioning Reference Signal (PRS) configuration information of the plurality of cells, and the processor delivers OTDOA assistant data to a physical layer from the higher layer and determines the RSTD measurement interval by the following Equation by using a plurality of cell-specific PRS periods obtained using the PRS configuration information:

$$T_{RSTD} = T_{PRS} \cdot (M-1) + \Delta \qquad \text{Equation}$$

where $T_{RSTD}$ denotes the length of the RSTD measurement interval, $T_{PRS}$ denotes the largest value of the plurality of cell-specific PRS transmission periods, M denotes the number of PRS positioning occasions in the RSTD measurement interval, and Δ denotes a measurement time for one PRS positioning occasion.

8. The user equipment of claim 7, wherein the RSTD measurement interval starts from a subframe having the nearest PRS positioning occasion after the OTDOA assistant data is transmitted to the physical layer.

9. The user equipment of claim 7, wherein the processor provides RSTD measurement information to a location server after the RSTD measurement interval has elapsed.

10. The user equipment of claim 9, wherein the processor provides RSTD measurement information about one or more cells satisfying a predetermined condition within the RSTD measurement interval to the location server.

11. The user equipment of claim 9, wherein the processor provides RSTD measurement information about a reference cell to the location server after a measurement interval determined using a PRS period of the reference cell has elapsed within the RSTD measurement interval.

12. The user equipment of claim 7, wherein the message including the OTDOA assistant data is received from a location server through a serving base station.

* * * * *